US 11,821,991 B2

(12) United States Patent
Shao et al.

(10) Patent No.: US 11,821,991 B2
(45) Date of Patent: Nov. 21, 2023

(54) DYNAMIC COMPENSATION WIND MEASUREMENT LIDAR SYSTEM AND WIND MEASUREMENT METHOD THEREOF

(71) Applicant: Nanjing Movelaser Co., Ltd., Jiangsu (CN)

(72) Inventors: Jianwei Shao, Jiangsu (CN); Hailong Zhu, Jiangsu (CN); Zengli Xiao, Jiangsu (CN); Zhi Li, Jiangsu (CN); Chen Deng, Jiangsu (CN)

(73) Assignee: Nanjing Movelaser Co., Ltd., Nanjing (CN)

( * ) Notice: Subject to any disclaimer, the term of this patent is extended or adjusted under 35 U.S.C. 154(b) by 0 days.

(21) Appl. No.: 18/299,583

(22) Filed: Apr. 12, 2023

(65) Prior Publication Data

US 2023/0251385 A1     Aug. 10, 2023

Related U.S. Application Data

(63) Continuation-in-part of application No. PCT/CN2021/115237, filed on Aug. 30, 2021.

(30) Foreign Application Priority Data

Oct. 14, 2020 (CN) .......................... 202011093266.7

(51) Int. Cl.
　　*G01S 17/95*　　(2006.01)
　　*G01P 13/02*　　(2006.01)
　　*G01P 5/26*　　(2006.01)

(52) U.S. Cl.
　　CPC ............ *G01S 17/95* (2013.01); *G01P 13/025* (2013.01); *G01P 5/26* (2013.01)

(58) Field of Classification Search
　　None
　　See application file for complete search history.

(56) References Cited

U.S. PATENT DOCUMENTS

| | | | |
|---|---|---|---|
| 7,739,823 B2 | 6/2010 | Shapira et al. | |
| 2021/0016872 A1* | 1/2021 | Inokuchi | B64D 45/00 |

FOREIGN PATENT DOCUMENTS

| | | |
|---|---|---|
| CN | 103605136 A | 2/2014 |
| CN | 103616696 A | 3/2014 |

(Continued)

OTHER PUBLICATIONS

Bu Zhichao; "Coherent wind measurement lidar system design and data processing algorithm research;" Beijing University of Technology, China PhD Thesis Full Text Database Information Science and Technology Series, chapters 2-3; Apr. 15, 2015; Translation provided by Chinable Intellectual Property.

(Continued)

*Primary Examiner* — Andre J Allen
*Assistant Examiner* — Jermaine L Jenkins
(74) *Attorney, Agent, or Firm* — Bayramoglu Law Offices LLC

(57) ABSTRACT

Disclosed is in the present disclosure a dynamic compensation wind measurement lidar system, including a laser, an A/D converter, a signal processor, and a data processor. The signal processor includes a power spectrum calculation module, a motion sensor, and a pulse integration module. The pulse integration module divides an optical pulse transmitted in a single beam period into n sections for integration, where real-time motion and attitude data collected by the motion sensor is added to each of the sections for integration to improve a signal-to-noise ratio by integrating a power spectral density for a plurality of periodic pulse signals. In the present disclosure, by means of integrating optical pulses in single-beam dwell time by sections and attitude superimposing, an attitude compensation frequency may be greatly increased, and the attitude compensation frequency is adjustable.

6 Claims, 3 Drawing Sheets

(56) References Cited

FOREIGN PATENT DOCUMENTS

| | | | |
|---|---|---|---|
| CN | 107271725 | A | 10/2017 |
| CN | 107807367 | A | 3/2018 |
| CN | 111766397 | A | 10/2020 |
| CN | 111965667 | A | 11/2020 |
| CN | 110988905 | B | 8/2021 |
| JP | 2014066548 | A | 4/2014 |
| WO | WO-2023015589 | A1 * | 2/2023 |

OTHER PUBLICATIONS

International Search Report and Written Opinion dated Aug. 30, 2021 in International Application No. PCT/CN2021/115237. Translation provided by Chinable Intellectual Property.

Notification on Grant of Patent Right for Invention dated Nov. 30, 2020, in Chinese Application No. 202011093266.7. Translation provided by Chinable Intellectual Property.

Office Action dated Nov. 26, 2020 in Chinese Application No. 202011093266.7. Translation provided by Chinable Intellectual Property.

* cited by examiner

DYNAMIC COMPENSATION WIND MEASUREMENT LIDAR SYSTEM AND WIND MEASUREMENT METHOD THEREOF

CROSS-REFERENCE TO RELATED APPLICATIONS

The present application is a continuation-in-part application of PCT international patent application No. PCT/CN2021/115237 filed with the National Intellectual Property Administration on Aug. 30, 2021, claiming priority to Chinese Patent Application No. 202011093266.7 filed with the National Intellectual Property Administration on Oct. 14, 2020 and entitled "DYNAMIC COMPENSATION WIND MEASUREMENT LIDAR SYSTEM AND WIND MEASUREMENT METHOD THEREOF", which is incorporated herein by reference in its entirety.

FIELD OF THE INVENTION

The present disclosure relates to the field of lidars, and in particular, to a dynamic compensation wind measurement lidar system and a wind measurement method thereof.

BACKGROUND OF THE INVENTION

At present, a wind measurement lidar system on the market mainly performs attitude compensation for a lidar during each sampling when measuring wind in a dynamic environment. A sampling frequency of the lidar is typically 1 Hz. As a result, an attitude compensation frequency for the lidar is also 1 Hz. In a complex dynamic environment, such as on buoy, on vehicle, or on airplane, an attitude change frequency of the lidar is generally greater than 1 Hz, and it is apparent that the attitude compensation frequency of 1 Hz cannot meet requirements of wind measurement.

The lidar needs to measure wind field information for a plurality of altitude levels at the same time. At present, a pulse lidar on the market mainly collects echo signals at fixed time, and a measurement distance is not adjusted in real time with an attitude of the lidar. As the attitude of the lidar changes, the altitude level for measurement also changes. At present, a mainstream manner is to calculate, in a later stage, the wind field information of the set altitude level by using an interpolation method by an exponential rate, accuracy of which is obviously poorer than that of directly measuring a target altitude level.

SUMMARY OF THE INVENTION

Regarding the issues mentioned in the background of the invention, the present disclosure proposes a dynamic compensation wind measurement lidar system and a wind measurement method thereof.

Technical Solutions

The present disclosure first discloses a wind measurement method of a dynamic compensation wind measurement lidar system, including steps:
S1. periodically switching optical signals generated by a multi-beam laser among a plurality of beams of light at a fixed frequency;
S2. receiving, by an optical antenna, the optical signal scattered by atmospheric aerosols and generating a beat signal from the optical signal and a seed optical signal;
S3. performing balance detection and A/D conversion on the beat signal and transmitting the beat signal to a signal processor to obtain a signal power spectrum while outputting, by a motion sensor, motion and attitude data of a lidar in real time;
dividing optical pulses transmitted in a single beam period into n sections for integration, wherein the real-time motion and attitude data collected by the motion sensor is added to each of the sections for integration to improve a signal-to-noise ratio by integrating a power spectral density for a plurality of periodic pulse signals;
S4. packaging and sending the signal power spectrum and the real-time motion and attitude data of the lidar to a data processor to obtain a radial wind speed of a beam; and
S5. obtaining a wind speed and a wind direction above the lidar by inversion in conjunction with the radial wind speed of the beam in a previous period.

Preferably, in S3, a pulse-signal power spectrum is obtained by performing calculations on an A/D sampling signal.

Preferably, in S3, a sampling interval of an A/D converter is adjusted in real time based on changes in attitude and altitude of the lidar by an equation:

$$t' = \frac{2L'}{c} = \frac{2 \times (H - \Delta H) \times |\vec{L'}|}{c \times [0\ 0\ 1] \times \vec{L'}}$$

where in the equation, t' represents the sampling interval after the change, $\vec{L'}$ represents a vector of the beam on an inertial coordinate axis after the change, c represents a speed of light in vacuum, L' represents a one-way distance from the beam to an altitude level after the change, H represents a perpendicular distance from the lidar to the altitude level before the change, and ΔH represents an altitude change of the lidar.

Preferably, in S3, pulses in a single beam period of the lidar are divided into n sections:

$$n = \frac{1000Ft}{M}$$

where t represents single-beam dwell time, a repetition frequency of the laser is F kHz, and M represents a number of times for pulse integration.

The present disclosure further discloses a dynamic compensation wind measurement lidar system, including:
a laser, configured to transmit a multi-beam optical signal; and an optical antenna, configured to receive the optical signal scattered by the atmospheric aerosols, and generate a beat signal from the optical signal with a seed optical signal;
an A/D converter, configured to perform sampling to perform balance detection, and A/D conversion on the beat signal and transmit the beat signal to a signal processor;
a signal processor, including a power spectrum calculation module, a motion sensor, and a pulse integration module, where
the power spectrum calculation module obtains a signal power spectrum;
the motion sensor outputs motion and attitude data of a lidar in real time; and the pulse integration module divides an optical pulse transmitted in a single beam period into n sections for integration, adds the real-time motion and attitude data collected by the motion sensor to each of the sections for integration, and improves a signal-to-noise ratio by integrating power spectral density for a plurality of periodic pulse signals; and a data processor, configured to perform data processing based on the signal power spectrum and the motion and attitude data of the lidar, to obtain a radial wind speed of a beam; and in conjunction with the radial wind speed of the beam in a previous period, invert to obtain a wind speed and a wind direction above the lidar.

Preferably, the power spectrum calculation module performs calculations on an A/D sampling signal to obtain a pulse-signal power spectrum.

Preferably, the signal processor further includes an altitude compensation system, and the altitude compensation system adjusts a sampling interval of the A/D converter in real time based on changes in attitude and altitude of the lidar:

$$t' = \frac{2L'}{c} = \frac{2 \times (H - \Delta H) \times |\overline{L'}|}{c \times [0\ 0\ 1] \times \overline{L'}}$$

where in the equation, t' represents a sampling interval after the change, L' represents a vector of the beam on an inertial coordinate axis after the change, c represents a speed of light in vacuum, L' represents a one-way distance from the beam to an altitude level after the change, H represents a perpendicular distance from the lidar to the altitude level before the change, ΔH represents an altitude change of the lidar, and the changes in the attitude and the altitude of the lidar are obtained from the motion sensor.

Preferably, pulses in a single beam period of the lidar are divided into n sections:

$$n = \frac{1000Ft}{M}$$

where t represents single-beam dwell time, repetition frequency of the laser is F kHz, and M represents a number of times for pulse integration.

Beneficial Effects

In the present disclosure, by means of integrating optical pulses in single-beam dwell time by sections and attitude superimposing, an attitude compensation frequency may be greatly increased, and the attitude compensation frequency is adjustable. In this way, the issue mentioned in the background of the invention that "In a complex dynamic environment, such as on buoy, on vehicle, or on airplane, an attitude change frequency of the lidar is generally greater than 1 Hz, and it is apparent that the attitude compensation frequency of 1 Hz cannot meet requirements of wind measurement" is resolved.

According to the present disclosure, based on the collected attitude information, calculation is performed in real time and AD is fed back to adjust collection time in real time, thereby ensuring that the lidar always measures information about a wind field at a target altitude level. In this way, the issue mentioned in the background of invention that "As the attitude of the lidar changes, the altitude level for measurement also changes" is resolved.

DETAILED DESCRIPTION OF THE EMBODIMENTS

The present disclosure is further described below with reference to embodiments, but the protection scope of the present disclosure is not limited hereto.

Figure 1:
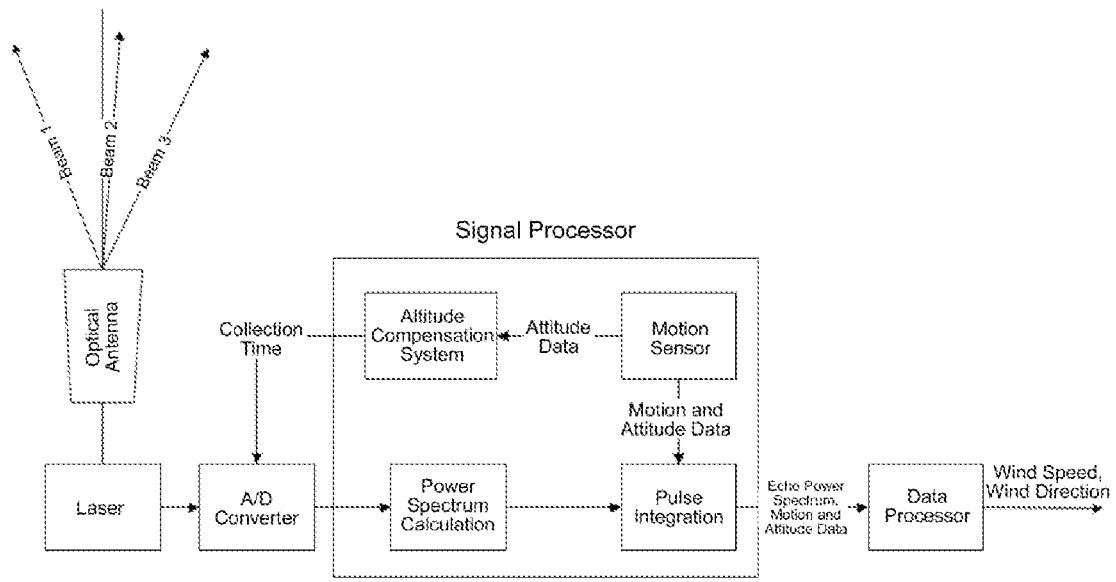
FIG. 1 is a principle diagram of horizontal detection of a lidar system according to the present disclosure.
Figure 4:
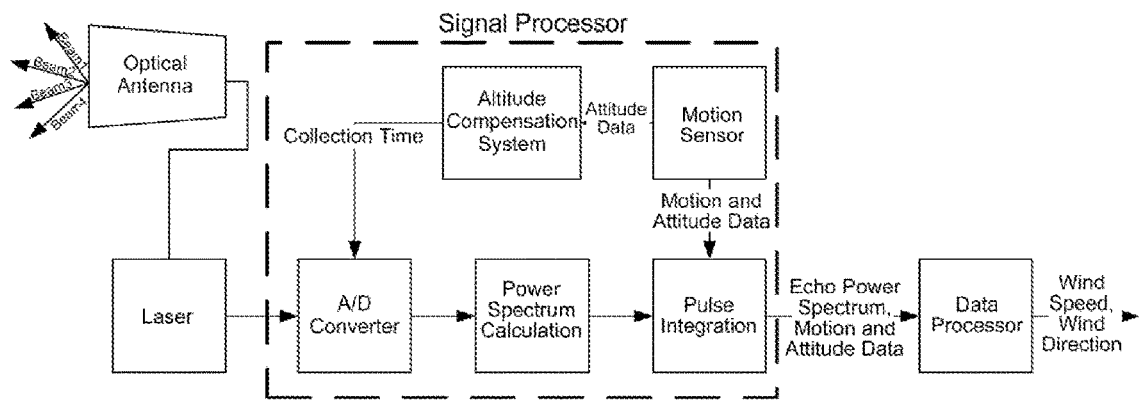
FIG. 4 is a principle diagram of vertical detection of a lidar system according to the present disclosure.

With reference to FIG. 1 and FIG. 4, the present disclosure discloses a dynamic compensation wind measurement lidar system, including:

a laser, configured to transmit a multi-beam optical signal; and an optical antenna, configured to receive the optical signal scattered by atmospheric aerosols, and generate a beat signal from the optical signal with a seed optical signal;

an A/D converter, configured to perform sampling to perform balance detection, and A/D conversion on the beat signal, and transmitting the beat signal to a signal processor;

the signal processor, including a power spectrum calculation module, a motion sensor, and a pulse integration module, where the power spectrum calculation module obtains a signal power spectrum;

the motion sensor outputs motion and attitude data of a lidar in real time, including angles, g values, and angular velocities of the x-axis, the y-axis, and the z-axis; and the pulse integration module divides an optical pulse transmitted in a single beam period into n sections for integration, where the real-time motion and attitude data collected by the motion sensor is added to each of the sections for integration to improve a signal-to-noise ratio by integrating power spectral density for a plurality of periodic pulse signals; and a data processor, configured to perform data processing based on the signal power spectrum and the motion and attitude data of the lidar to obtain a radial wind speed of a beam; and obtain a wind speed and a wind direction above the lidar by inversion in conjunction with the radial wind speed of the beam in a previous period.

In the lidar system in FIG. 1, the lidar is placed horizontally for wind to be measured has a wind direction vertical to the ground. In the lidar system in FIG. 4, the lidar is placed vertically for wind to be measured has a wind direction parallel to the ground. The A/D converter may be provided as a part of the signal processor, or may be provided separately.

In present application, "performing data processing based on the signal power spectrum and the motion and attitude data of the lidar to obtain the radial wind speed of the beam" and "obtaining the wind speed and the wind direction above the lidar by inversion based on the radial wind speed of the beam" are both prior technologies. For details, reference may be made to the paper "Research on Key Technologies of Coherent Doppler Wind Measurement Lidar" (《相干多普勒测风激光雷达关键技术研究》) of Zhu Xiaopeng. The innovation of present application is that the pulse integration module integrates single-beam pulses by sections to improve an attitude compensation frequency.

Since the lidar uses a high repetition frequency laser with a repetition frequency up to tens of kHz. Assuming that the repetition frequency of the laser is F kHz, and single-beam dwell time of a beam 1 and a beam 2 is t seconds, a number of optical pulses transmitted for a single beam period is 1000*F*t.

Figure 2:
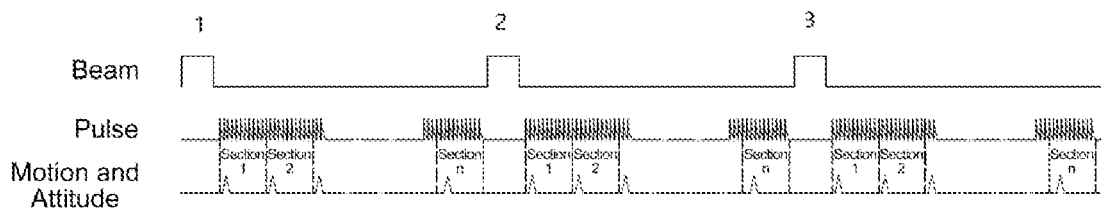
FIG. 2 is a timing diagram of sectional attitude and motion compensation according to the present disclosure.

As shown in FIG. 2, the 1000 Ft pulses may be divided into n sections for integration, and the real-time motion and attitude data collected by the motion sensor may be added in each of the sections for integration. To meet requirements of wind measurement, it needs to be ensured that a signal-to-noise ratio CNR is greater than Tdb. On this basis, a minimum number of times, M, for pulse integration may be determined, and at most, pulses in a single beam period of the lidar may be divided into:

$$n = \frac{1000Ft}{M}$$

t represents the single-beam dwell time, the repetition frequency of the laser is F kHz, and M represents a number of times for pulse integration.

A maximum attitude compensation frequency of the lidar may reach $$f = \frac{n}{t} = \frac{1000F}{M} \text{Hz}.$$

According to an actual situation, the attitude compensation frequency may be reasonably adjusted by arbitrarily selecting a number of times for pulse integration that is not less than M. Meanwhile, the maximum attitude compensation frequency may be further enhanced by increasing the repetition frequency of the laser.

Meanwhile, to resolve the issue mentioned in the background of the invention that "As the attitude of the lidar changes, the altitude level for measurement also changes", the signal processor in present application further includes an altitude compensation system. A sampling interval of A/D is adjusted in real time based on changes in attitude and altitude of the lidar.

Figure 3:
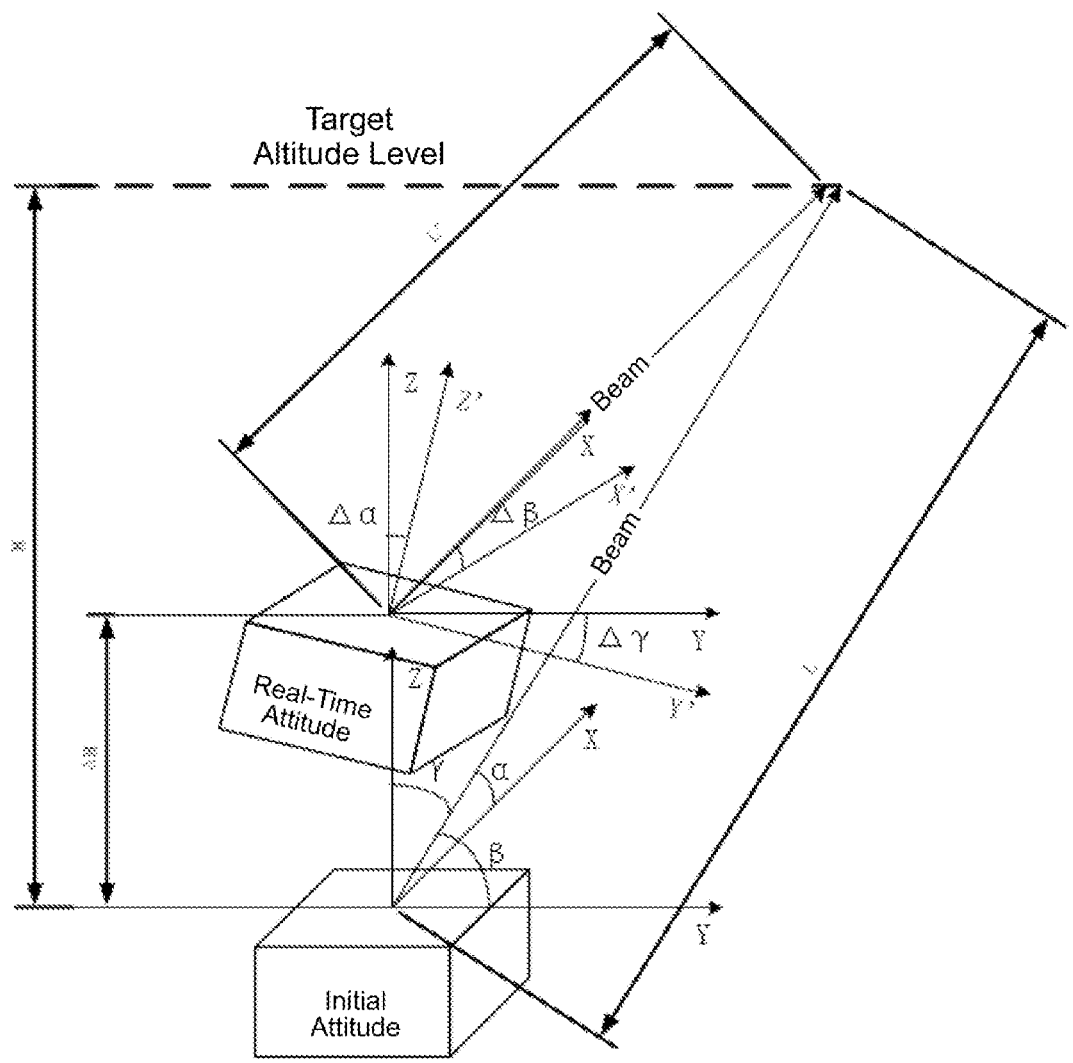
FIG. 3 is a principle diagram of an altitude compensation system for horizontal detection of a lidar system according to the present disclosure.
Figure 5:
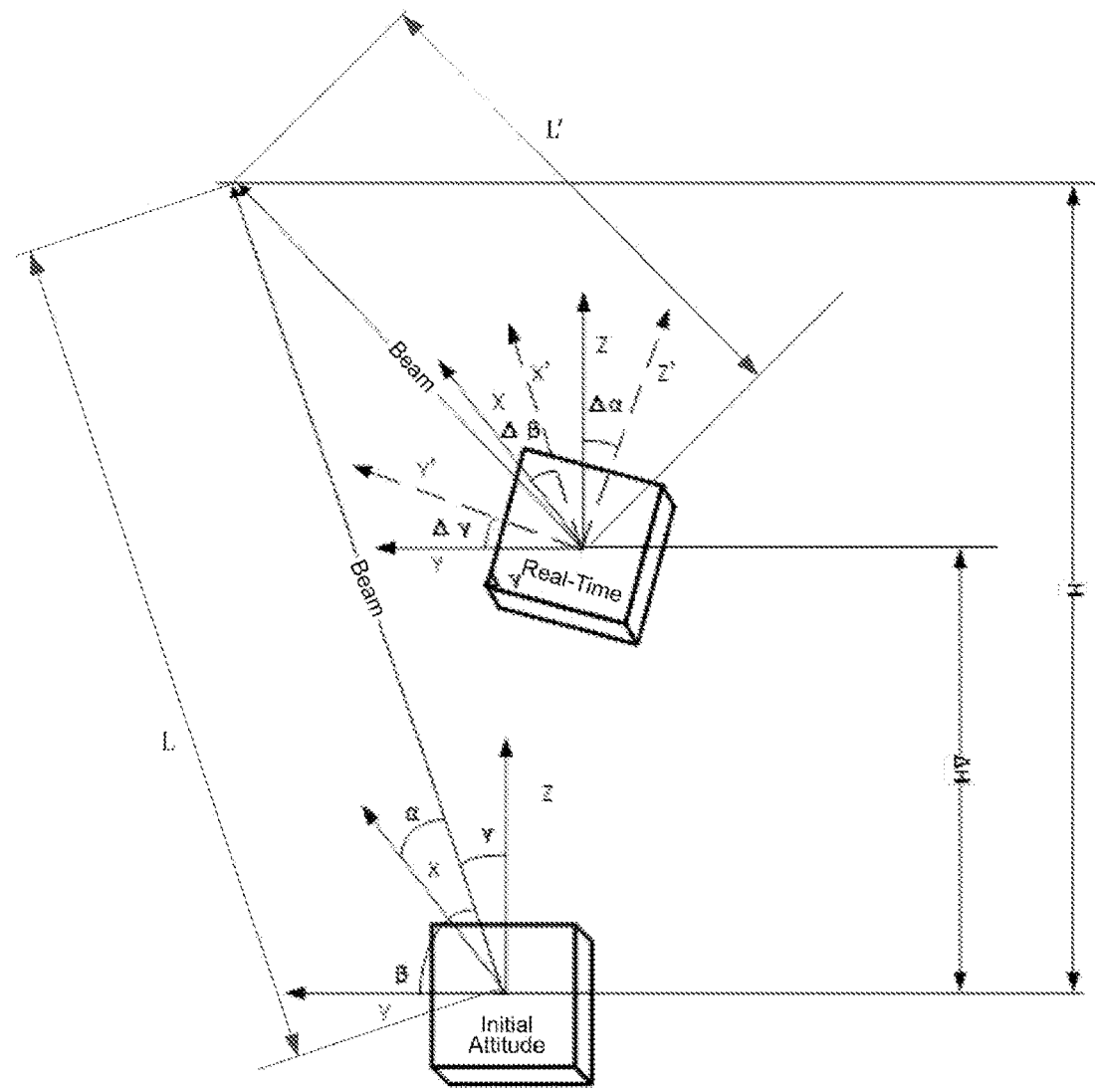
FIG. 5 is a principle diagram of an altitude compensation system for vertical detection of a lidar system according to the present disclosure.

FIG. 3 is a principle diagram of a horizontally placed lidar, where the measured wind has a wind direction vertical to the ground. FIG. 5 is a principle diagram of a vertically placed lidar, where the measured wind has a wind direction parallel to the ground. For both of the above cases, attitude compensation may be performed through the following calculations. As shown in FIG. 3 and FIG. 5, when the lidar is in an initial attitude, the beam on inertial coordinate axes (X, Y, Z) has a unit vector:

$$\vec{L} = \begin{bmatrix} \cos\alpha \\ \cos\beta \\ \cos\gamma \end{bmatrix}.$$

Then, the sampling interval of A/D is $$t = \frac{2L}{c} = \frac{2 \times H \times |\vec{L}|}{c \times [0\ 0\ 1] \times \vec{L}}.$$

c represents a speed of light in vacuum, H represents a perpendicular distance from the lidar to the altitude level before the change, and $\vec{L}$ represents a vector of the beam on the inertial coordinate axis.

As the real-time attitude of the lidar changes, included angles between three coordinate axes (X', Y', Z') of the lidar and internal coordinate axes respectively become $\Delta\alpha$, $\Delta\beta$, $\Delta\gamma$ (when viewed from a negative direction of a rotation axis, a positive direction of a rotation angle is positive along a clockwise direction, and is negative along a counterclockwise direction). Then, the vector of the beam on the inertial coordinate axis becomes into:

$$\vec{L'} = R_x(\Delta\alpha)R_y(\Delta\beta)R_z(\Delta\gamma)/\vec{L}$$

where:

$$R_x(\Delta\alpha) = \begin{bmatrix} 1 & 0 & 0 \\ 0 & \cos\Delta\alpha & -\sin\Delta\alpha \\ 0 & \sin\Delta\alpha & \cos\Delta\alpha \end{bmatrix}$$

$$R_y(\Delta\beta) = \begin{bmatrix} \cos\Delta\beta & 0 & \sin\Delta\beta \\ 0 & \cos 1 & 0 \\ -\sin\Delta\beta & 0 & \cos\Delta\beta \end{bmatrix}$$

$$R_z(\Delta\alpha) = \begin{bmatrix} \cos\Delta\gamma & -\sin\Delta\gamma & 0 \\ \sin\Delta\gamma & \cos\Delta\gamma & 0 \\ 0 & 0 & 1 \end{bmatrix}.$$

Then, the sampling interval of A/D becomes into:

$$t' = \frac{2L'}{c} = \frac{2 \times (H - \Delta H) \times |\vec{L'}|}{c \times [0\ 0\ 1] \times \vec{L'}}.$$

In the equation, t' represents a sampling interval after the change, $\vec{L'}$ represents a vector of the beam on the inertial coordinate axis after the change, c represents the speed of light in the vacuum, L' represents a one-way distance from the beam to the altitude level after the change, H represents a perpendicular distance from the lidar to the altitude level before the change, $\Delta H$ represents an altitude change of the lidar, and the changes in the attitude and in the altitude of the lidar are obtained from the motion sensor.

According to this scheme, by adjusting the sampling interval in real time, it is ensured that data about the wind speed and the wind direction at a set altitude level is measured by the lidar, with a wind measurement accuracy which would not be affected by an altitude error.

The specific embodiments described herein are merely examples for illustrating the spirit of the present disclosure.

A skilled in the art of the present disclosure may make various modifications or supplements to the specific embodiments described or may replace the same by equivalents, but would not deviate from the spirit of the present disclosure or go beyond the scope defined in the appended claims.

What is claimed is:

1. A wind measurement method of a dynamic compensation wind measurement lidar system, comprising steps:
   S1. periodically switching optical signals generated by a multi-beam laser among a plurality of beams of light at a fixed frequency;
   S2. receiving, by an optical antenna, the optical signal scattered by atmospheric aerosols and generating a beat signal from the optical signal and a seed optical signal;
   S3. performing balance detection and A/D conversion on the beat signal and transmitting the beat signal to a signal processor to obtain a signal power spectrum while outputting, by a motion sensor, motion and attitude data of a lidar in real time;
   dividing optical pulses transmitted in a single beam period into n sections for integration, wherein the real-time motion and attitude data collected by the motion sensor is added to each of the sections for integration to improve a signal-to-noise ratio by integrating a power spectral density for a plurality of periodic pulse signals;
   adjusting a sampling interval of an A/D converter in real time based on changes in attitude and altitude of the lidar by an equation:

$$t' = \frac{2L'}{c} = \frac{2 \times (H - \Delta H) \times |\vec{L'}|}{c \times [0\ 0\ 1] \times \vec{L'}}$$

wherein in the equation, t' represents the sampling interval after the change, $\vec{L'}$ represents a vector of the beam on an inertial coordinate axis after the change, c represents a speed of light in vacuum, L' represents a one-way distance from the beam to an altitude level after the change, H represents a perpendicular distance from the lidar to the altitude level before the change, and ΔH represents an altitude change of the lidar;
   S4. packaging and sending the signal power spectrum and the real-time motion and attitude data of the lidar to a data processor to obtain a radial wind speed of a beam; and
   S5. obtaining a wind speed and a wind direction above the lidar by inversion in conjunction with the radial wind speed of the beam in a previous period.

2. The method according to claim 1, wherein, in S3, a pulse-signal power spectrum is obtained by performing calculations on an A/D sampling signal.

3. The method according to claim 1, wherein, in S3, pulses in a single beam period of the lidar are divided into n sections:

$$n = \frac{1000Ft}{M}$$

wherein t represents single-beam dwell time, a repetition frequency of the laser is F kHz, and M represents a number of times for pulse integration.

4. A dynamic compensation wind measurement lidar system, comprising:
   a laser, configured to transmit a multi-beam optical signal; and an optical antenna, configured to receive the optical signal scattered by atmospheric aerosols and generate a beat signal from the optical signal and a seed optical signal;
   an A/D converter, configured to perform sampling on the beat signal to perform balance detection and A/D conversion on the beat signal, and transmitting the beat signal to a signal processor;
   the signal processor, comprising a power spectrum calculation module, a motion sensor, a pulse integration module and an altitude compensation system, wherein
      the power spectrum calculation module obtains a signal power spectrum;
      the motion sensor outputs motion and attitude data of a lidar in real time; and
      the pulse integration module divides an optical pulse transmitted in a single beam period into n sections for integration, wherein the real-time motion and attitude data collected by the motion sensor is added to each of the sections for integration to improve a signal-to-noise ratio by integrating a power spectral density for a plurality of periodic pulse signals;
   the altitude compensation system adjusts a sampling interval of an A/D converter in real time based on changes in attitude and altitude of the lidar by an equation:

$$t' = \frac{2L'}{c} = \frac{2 \times (H - \Delta H) \times |\vec{L'}|}{c \times [0\ 0\ 1] \times \vec{L'}}$$

wherein in the equation, t' represents the sampling interval after the change, $\vec{L'}$ represents a vector of the beam on an inertial coordinate axis after the change, c represents a speed of light in vacuum, L' represents a one-way distance from the beam to an altitude level after the change, H represents a perpendicular distance from the lidar to the altitude level before the change, and ΔH represents an altitude change of the lidar; and
   a data processor, configured to perform data processing based on the signal power spectrum and the motion and attitude data of the lidar to obtain a radial wind speed of a beam; and obtain a wind speed and a wind direction above the lidar by inversion in conjunction with the radial wind speed of the beam in a previous period.

5. The system according to claim 4, wherein the power spectrum calculation module performs calculations on an A/D sampling signal to obtain a pulse-signal power spectrum.

6. The system according to claim 4, wherein pulses in a single beam period of the lidar are divided into n sections:

$$n = \frac{1000Ft}{M}$$

wherein t represents single-beam dwell time, repetition frequency of the laser is F kHz, and M represents a number of times for pulse integration.

* * * * *